(12) United States Patent
Buescher

(10) Patent No.: US 12,494,720 B2
(45) Date of Patent: Dec. 9, 2025

(54) RECTIFIER CIRCUIT FOR AN RFID TAG

(71) Applicant: EM Microelectronic-Marin SA, Marin (CH)

(72) Inventor: Kevin Scott Buescher, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 18/887,619

(22) Filed: Sep. 17, 2024

(65) Prior Publication Data

US 2025/0175093 A1   May 29, 2025

(30) Foreign Application Priority Data

Nov. 24, 2023   (EP) ..................................... 23212017

(51) Int. Cl.
| | |
|---|---|
| *H02M 7/217* | (2006.01) |
| *G06K 19/07* | (2006.01) |
| *H02J 50/00* | (2016.01) |
| *H02J 50/20* | (2016.01) |

(52) U.S. Cl.
CPC ........ *H02M 7/217* (2013.01); *G06K 19/0707* (2013.01); *H02J 50/001* (2020.01); *H02J 50/20* (2016.02)

(58) Field of Classification Search
CPC .......... H02M 7/00; H02J 50/001; H02J 50/20
See application file for complete search history.

(56) References Cited

U.S. PATENT DOCUMENTS

| | | | | | |
|---|---|---|---|---|---|
| 6,134,130 | A | * | 10/2000 | Connell | ................... H02J 50/12 363/70 |
| 6,996,726 | B1 | * | 2/2006 | Den Besten | ..... G06K 19/07363 713/320 |
| 10,033,364 | B1 | * | 7/2018 | Coban | .................. H03K 5/1532 |
| 2006/0187049 | A1 | * | 8/2006 | Moser | .............. G06K 19/07749 340/693.1 |

(Continued)

FOREIGN PATENT DOCUMENTS

| | | |
|---|---|---|
| EP | 1 691 320 A1 | 8/2006 |
| EP | 1 960 947 B1 | 9/2010 |
| GB | 2 395 628 A | 5/2004 |

OTHER PUBLICATIONS

European Search Report in European Application No. EP 23212017, dated Apr. 10, 2024.

*Primary Examiner* — Rexford N Barnie
*Assistant Examiner* — Joseph N Inge
(74) *Attorney, Agent, or Firm* — Sughrue Mion, PLLC

(57) ABSTRACT

A rectifier circuit (10) for a passive RFID circuit (1), including: a first rectifier stage (11) having a positive stage input (14) connectable to a first antenna port (6) and a negative stage input (15) connectable to a second antenna port (7); a first rectifying unit (12) connected to the positive stage input (14) and to a positive stage output (16); a second rectifying unit (18) connected to the negative stage input (15) and to a negative stage output (17); and a trimming capacitor (30) connected to the positive stage input (14) and to the negative stage input (15). The trimming capacitor (30) is electronically switchable to a first capacitance and to a second capacitance, and a voltage dependent variable capacitor (50) is connected to the positive stage input (14) and to the negative stage input (15).

13 Claims, 5 Drawing Sheets

(56) References Cited

U.S. PATENT DOCUMENTS

| | | | | |
|---|---|---|---|---|
| 2007/0087719 A1* | 4/2007 | Mandal | ................... | H01Q 1/22 |
| | | | | 455/299 |
| 2017/0264211 A1* | 9/2017 | Christiaans | ............ | G01R 15/16 |
| 2018/0189626 A1* | 7/2018 | Gila | ..................... | H04B 17/318 |
| 2019/0334384 A1* | 10/2019 | Yase | ....................... | H02M 3/07 |

* cited by examiner

RECTIFIER CIRCUIT FOR AN RFID TAG

CROSS REFERENCE TO RELATED APPLICATION

This application claims priority from European Patent Application No. 23212017.0, filed Nov. 24, 2023, which is hereby incorporated by reference in its entirety into this application.

FIELD OF THE INVENTION

In one aspect, the present invention relates to the field of rectifiers for use in RFID circuits, in particular for use in UHF RFID passive tags.

BACKGROUND

In general, in an RFID communication system, a receiving tag antenna may be adapted to maximize the received signal at a specific frequency, i.e. the tuning or trimming frequency. The adaption may be achieved for a specific antenna and tag input impedance. Every time an input frequency signal differs from the tuning frequency or when the tag or antenna impedance differs from a value required to achieve adaptation the system suffers a loss in the received power. In operating conditions, various disrupting scenarios may take place for the following reasons:

- an input signal frequency can operate at different frequencies in the UHF RFID band [860-960] MHz,
- variations in electronic component values due to process or temperature may cause variation in the tag input impedance,
- and/or varying environmental conditions in which the tag operates, e.g. varying degrees of humidity, temperature and so on, and may alter the antenna impedance or adaptation.

An RFID circuit may be equipped with an automatic matching function by way of which the tag becomes operable to execute a trimming algorithm by way of which the input impedance of the RFID circuit, e.g. the input impedance of a rectifier circuit, can be automatically adapted, tuned or trimmed to the frequency of the received RF signal.

In general, manufacturing tolerances and environmental issues as described above can de-tune the RFID tag, which reduces the RFID tag performance. An initial start of the RFID tag can be therefore become problematic as there may not be enough energy present due to antenna to tag mismatch to initiate the automatic matching function, i.e. to execute the automatic trimming algorithm.

Conducting of an automatic matching or trimming function requires at least a minimum of electric power harvested from the received RF field. However, in an initial start-up configuration of the RFID tag there may not be sufficient electric power from the external RF field due to antenna to tag mismatch. This problem is exacerbated because the trimming algorithm cannot default to a mid-trim point since there is not sufficient voltage available to set up any switches of a trimming or tunable capacitor arrangement by way of which the resonant frequency of the rectifier could be adapted or tuned to the frequency of the available RF field.

It is therefore desirable to provide improvements to the start-up capability of a rectifier circuit of an RFID circuit under poor matching conditions caused by default settings of a trimming algorithm being e.g. at an extreme frequency, wherein no switching functionality is available when there is no voltage or only little voltage available at the start up.

The documents EP 1 691 320 A1 and US 2018/189626 A1 describe a rectifier circuit for a passive RFID circuit. Said rectifier circuit comprises a positive stage input connectable to a first antenna port, and comprises a negative stage input connectable to a second antenna port. A first rectifying unit is connected to the positive stage input and connected to a positive stage output. A second rectifying unit is connected to the negative stage input and connected to a negative stage output. A trimming capacitor arrangement is connected to the positive stage input and connected to the negative stage input. Said trimming capacitor arrangement is electronically switchable to at least a first capacitance and to a second capacitance. Nothing is described concerning a further tuning element, for having a voltage dependent variable capacitor arrangement connected to the positive stage input and connected to the negative stage input.

SUMMARY OF THE INVENTION

The above-mentioned objects will be solved and suitably addressed by a rectifier circuit, by a semiconductor device and by a method of operating a semiconductor device in accordance to the features of the independent claims. Examples and embodiments will be subject matter of the dependent claims.

According to one aspect, there is provided a rectifier circuit for a passive RFID circuit. Each rectifier stage is differential and the first stage connects to two antenna ports. The rectifier circuit comprises at least a first differential rectifier stage comprising a positive input connectable to a first antennal port and comprising a negative input connectable to a second antenna port. (as explained below in FIG. 1). The rectifier circuit further comprises a first rectifying unit connected to the first stage input and connected to a first stage output. The rectifier circuit further comprises a second rectifying unit connected to the second stage input and connected to a second stage output. The rectifier circuit further comprises a trimming capacitor arrangement connected to the first stage input and connected to the second stage input. The trimming capacitor arrangement is electronically switchable to at least a first capacitance and to a second capacitance. By way of the trimming capacitor arrangement, the resonance frequency of the rectifier circuit can be modified electronically, e.g. by an automatic matching function or by a trimming algorithm, e.g. provided by a logic circuit of the RFID circuit.

The rectifier circuit further comprises a voltage dependent variable capacitor arrangement connected to the first stage input and connected to the second stage input. By way of the voltage dependent variable capacitor arrangement there is provided an additional or an excess capacitance, which is available directly at the start of the RFID circuit or rectifier circuit to emulate a starting at or near a mid-trimming condition. Typically, the voltage dependent variable capacitor has a capacitance to voltage response that is inversely related to the voltage. In other words, the capacitance of the voltage dependent variable capacitor is at a certain default level when there is no voltage applied to the voltage dependent variable capacitor arrangement. The capacitance of the voltage dependent variable capacitor arrangement decreases with an increase of the voltage applied to the voltage dependent variable capacitor arrangement.

In other words, at an initial condition, where there is no or only a rather low level of input voltage the voltage dependent variable capacitor arrangement provides a maximum capacitance in addition to the trimming capacitor arrangement. In this way, there can be provided a predefined threshold capacitance, that might be in the range of a mid-trimming range of the trimming capacitor arrangement. In this way, the resonance frequency of the rectifier circuit can be tuned or trimmed to a midrange despite the fact that there is no voltage or insufficient voltage available for switching the trimming capacitor arrangement to such a mid-range capacitance.

In this way, a tag to antenna mismatch at the start of the RFID circuit can be reduced per default. This leads to a reduced tag antenna mismatch, which allows to harvest electrical energy faster and more efficient compared to solutions, without the voltage dependent variable capacitor arrangement.

As the voltage level increases during start-up of the rectifier circuit or during start-up of the RFID circuit, the influence or the impact of the voltage dependent variable capacitor constantly decreases due to the voltage dependency of the variable capacitor arrangement. The rectifier circuit may be then subject to an automatic matching function and a respective tuning algorithm may be executed by way of which the trimming capacitor arrangement is switched to a desirable capacitance by way of which the resonant frequency of the rectifier circuit can be properly matched with the frequency of the RF field. This may lead to an increase of energy harvesting from the RF field and to a further increase of the input voltage, which may be then sufficient to start the functional operation of the RFID circuit, i.e. to operate the logic circuit of the RFID circuit.

According to a further example, the voltage dependent variable capacitor arrangement comprises a first varactor connected to the first stage input, which is a positive stage input. By way of a first varactor, there can be provided a voltage dependent variable capacitance at the first stage input, which provides an offset or default capacitance for an initial start-up of the rectifier circuit.

According to a further example, the first varactor comprises a cathode and an anode. The cathode of the first varactor is connected to the first stage input. The anode of the first varactor is connected to ground. This way, there can be provided an extra or excessive capacitance at the start-up of the rectifier circuit, this extra capacitance decreases with an increase of the voltage provided at the first stage input.

According to a further example, the voltage dependent variable capacitor arrangement comprises a second varactor connected to the second stage input, which is a negative stage input. By way of a second varactor there can be provided a voltage dependent variable capacitance at the second stage input, which provides an offset or default capacitance for an initial start-up of the rectifier circuit.

According to a further example, the second varactor comprises a cathode and an anode. The cathode of the second varactor is connected to the second stage input. The anode of the second varactor is connected to ground. This way, there can be provided an extra or excessive capacitance at the start-up of the rectifier circuit, which extra capacitance decreases with an increase of the voltage provided at the second stage input.

Typically and with some examples, the rectifier circuit comprises a first varactor and a second varactor, wherein the cathode of the first and the second varactors are connected to the positive stage input and to the negative stage input, respectively. The anodes of the first and the second varactors are connected to ground. In this way, the positive stage input and the negative stage input can be equally provided with an offset or extra capacitance at the start-up of the rectifier circuit.

Typically, and according to a further example, the capacitance of the first varactor is equal to the capacitance of the second varactor. The first and the second varactors may be substantially identical with regards to their capacitance to voltage response.

According to a further example, the rectifier circuit comprises a first capacitor parallel to the first varactor and a second capacitor parallel to the second varactor. This way, they can be added a constant capacitance to the voltage dependent capacitance of the first and second varactors. Providing this constant capacitance to the voltage dependent directors can be beneficial to dampen or to compensate the impact of the excess capacitance of the first and second varactors to automatic matching function or trimming algorithm of the rectifier circuit.

According to a further example, the first rectifying unit comprises a first transistor, wherein one of a source and a drain of the first transistor is connected to the first stage input, wherein the other one of the source and the drain of the first transistor is connected to the first stage output and wherein a gate of the first transistor is connected to the second stage output. The first transistor may provide rectification of an AC signal derived from the antenna and provided by the first stage input.

Typically and according to a further example, the second rectifying unit comprises a second transistor, wherein one of a drain and a source of the second transistor is connected to the second stage input, wherein the other one of the drain and the source of the second transistor is connected to the second stage output and wherein a gate of the second transistor is connected to the first page output. In other words, the first and the second transistors, i.e. the first and the second rectifying units are arranged in a bridging configuration. They may be cross connected.

Accordingly, the second rectifying unit, e.g. the second transistor provides rectification of an AC signal derived from the RF field and provided via the second stage input. The first rectifying unit, e.g. the first transistor provides rectification of an AC signal derived from the RF field and provided via the first stage input.

According to a further example and when the source of the first transistor is connected to the first stage input, the drain of the second transistor is connected to the second stage input. Here, the drain of the first transistor is connected to the first stage output and the source of the second transistor is connected to the second stage output.

Vice versa, and when the drain of the first transistor is connected to the first stage input, the source of the second transistor is connected to the second stage input. Here, the source of the first transistor is connected to the first stage output and the drain of the second transistor is connected to the second stage output.

According to a further example, the rectifier circuit comprises a second rectifier stage comprising a third stage input connected to the first stage output of the first rectifier stage and further comprises a fourth stage input connected to the second stage output of the first rectifier stage. Providing a rectifier circuit with numerous rectifier stages improves the result of the rectifier function. Typically, the rectifier circuit comprises numerous rectifier stages arranged in series or arranged in a cascaded manner.

Preferably, a first rectifier stage of the rectifier may be connected to a ground generator and the last rectifier stage of the rectifier may be connected to a signal combiner. Typically, each rectifier stage is individually connected to the first antenna port and to the second antenna port.

According to a further example, the trimming capacitor arrangement comprises a first switchable capacitor branch connected to the positive stage input and connected to the negative stage input. The first switchable capacitor branch may provide a first extra capacitance to the first rectifier stage. This first extra capacitance may be either switched on or switch off electronically by operating a respective switch. Operating the switch and hence adding of the first extra capacitance requires harvesting of a minimum switching voltage level from the RF field, i.e. a voltage above a predefined switching voltage threshold in order to execute a switching and to execute the automatic matching function or to execute the trimming algorithm by way of which the switchable capacitor branch can be either switched on or switched off.

According to a further example, the trimming capacitor arrangement comprises a second switchable capacitor branch, which is arranged parallel to the first switchable capacitor branch. The second switchable capacitor branch may provide a second extra capacitance to the first rectifier stage. The capacitance of the second capacitor branch may differ from the capacitance of the first capacitor branch. In some examples, the extra capacitances provided by the first and the second capacitor branches may be substantially equal.

The second switchable capacitor branch may be individually and independently switchable compared to the first switchable capacitor branch. Both, the first and the second switchable capacitor branches are electronically switchable, e.g. by an automatic matching function or by a respective trimming algorithm, e.g. executed by a logic circuit or logic unit of the passive RFID circuit.

According to a further example, the first switchable capacitor branch comprises a first capacitor in series with the first switch. One of the first capacitor and the first switch is connected to ground. The other one of the first capacitor and the first switch is connected to the first stage input.

In this way and by operating the first switch, an extra capacitance can be provided by the first capacitor and can be selectively added or coupled to the first stage input electronically, i.e. by operating the respective switch.

According to a further example, the first switchable capacitor branch comprises a second capacitor in series with a second switch. One of the second capacitor and the second switch is connected to ground. The other one of the second capacitor and the second switch is connected to the second stage input. This way, also the second stage input can be selectively provided with a second extra capacitance, namely when the second switch is closed.

Typically, the first capacitor and the second capacitor are of equal capacitance. In this way, and by switching the first and the second switches concurrently or simultaneously, both, the first stage input and the second stage input can be provided with a respective and common extra capacitance. This allows for an effective trimming or tuning of the trimming capacitor arrangement.

The second capacitor branch parallel to the first switchable capacitor branch may be switchable in a likewise manner. The second switchable capacitor branch may be equally equipped with first and second capacitors as well as with first and second switches connected to the respective capacitors.

The capacitors of the second switchable capacitor branch may comprise a capacitance that differs from the capacitance of the capacitors of the first switchable capacitor branch. In this way, different extra capacitances can be added or coupled to the first and second stage input in order to adapt the resonance frequency of the rectifier circuit to the frequency of the RF field.

According to a further example, the first switch comprises a first switching transistor. The second switch comprises a second switching transistor. The gate of the first switching transistor and the second switching transistor may be mutually connected or coupled. In this way, both switching transistors, i.e. the first switching transistor and the second switching transistor of the first or second switchable capacitor branch can be switched simultaneously or concurrently.

In this way, the extra capacitance provided by first and second capacitors of the respective first and/or second switchable capacitor branches can be simultaneously coupled to or decoupled from the positive and negative stage inputs, respectively.

In a further aspect, the present invention also relates to a semiconductor device comprising a RF antenna and comprising a rectifier circuit as described above. The semiconductor device further comprises a logic circuit, which is operable to electronically switch the trimming capacitor arrangement of the rectifier circuit to at least one of the first capacitance and the second capacitance.

Here and during start-up of the semiconductor device, and when the resonance frequency of the rectifier circuit is mismatched compared to the frequency of the signal provided by the RF antenna the variable capacitor arrangement of the rectifier circuit provides an extra capacitance, by way of which the trimming of the trimming capacitor arrangement can be effectively set to a midpoint or to a middle region of a trimming range. Typically, the trimming capacitor arrangement may be switchable between a minimum capacitance and a maximum capacitance. The extra capacitance or excess capacitance provided by the voltage dependent variable capacitor may be in a range midway between the minimum capacitance and the maximum capacitance. In this way, the extra capacitance provided per default by the voltage dependent variable capacitor arrangement can be effectively used start-up of the rectifier circuit, i.e. when the voltage is at a particular low level or zero voltage level. In this way, the automatic matching function or the trimming algorithm to trim or to tune the trimming capacitor arrangement to a desirable capacitance can effectively start on the basis of the extra or excess capacitance as provided by the voltage dependent variable capacitor.

In the course of a rising voltage, due to harvesting of electrical energy from the RF field, the influence of the voltage dependent variable capacitor arrangement successively decreases and has a decreasing impact on the execution of the automatic matching function provided by the logic circuit operating or tuning the trimming capacitor arrangement to a capacitance value that provides a best match to adapted the resonance frequency of the rectifier circuit to the frequency of the RF field.

Typically, the semiconductor device is implemented as a passive RFID tag. In addition to the RF antenna, the rectifier circuit and the logic circuit may comprise at least one of the further electronic components: a reference voltage generator, a shunt limiter, an auto-match comparator, a ring oscillator and a thermometer encoder as will be described further below.

The semiconductor device comprises a rectifier circuit as described above. Insofar, all effects, features and benefits as described above in connection with the rectifier circuit equally apply to the semiconductor device; and vice versa.

According to another aspect, there is provided a method of operating a semiconductor device as described above. The method comprises the steps of harvesting electrical energy from an external RF field by the RF antenna of the semiconductor device. In a further step, there is provided an extra capacitance to the positive stage input and/or to the negative stage input of the rectifier circuit by a voltage dependent variable capacitor arrangement.

This extra or excess capacitance is provided to the positive and negative stage inputs as long as an input voltage derived from the external RF field is below a switching voltage threshold, which threshold defines a minimum voltage required for electronically switching the trimming capacitor arrangement of the rectifier circuit.

By adding or providing the extra capacitance to the positive and negative stage input of the rectifier circuit, there can be emulated a starting condition at or near a midpoint trimming location of the trimming capacitor arrangement even though the switches for operating the trimming capacitor arrangement cannot yet be operated due to the low power or low-voltage conditions available at the start-up of the rectifier circuit.

As soon as the voltage increases at the positive and at the negative stage inputs the impact or influence of the voltage dependent variable capacitor arrangement substantially decreases. When the input voltage derived from the external RF field is at or above the switching voltage threshold the trimming capacitor arrangement can be operated to conduct or to execute an automatic matching function or an automatic trimming algorithm by way of which a best matching and hence a desirable capacitance of the trimming capacitor arrangement can be selected for tuning or trimming the resonance frequency of the rectifier circuit to the frequency of the RF field.

The method of operating a semiconductor device is typically executable by a rectifier circuit and by a semiconductor device as described above. Insofar, all features, effects and benefits as described above in connection with the rectifier circuit and/or the semiconductor device equally apply to the method of operating the semiconductor device; and vice versa.

BRIEF DESCRIPTION OF THE DRAWINGS

In the following numerous examples of the invention will be described in greater detail by making reference to the drawings, in which.

DETAILED DESCRIPTION OF THE INVENTION

Figure 3:
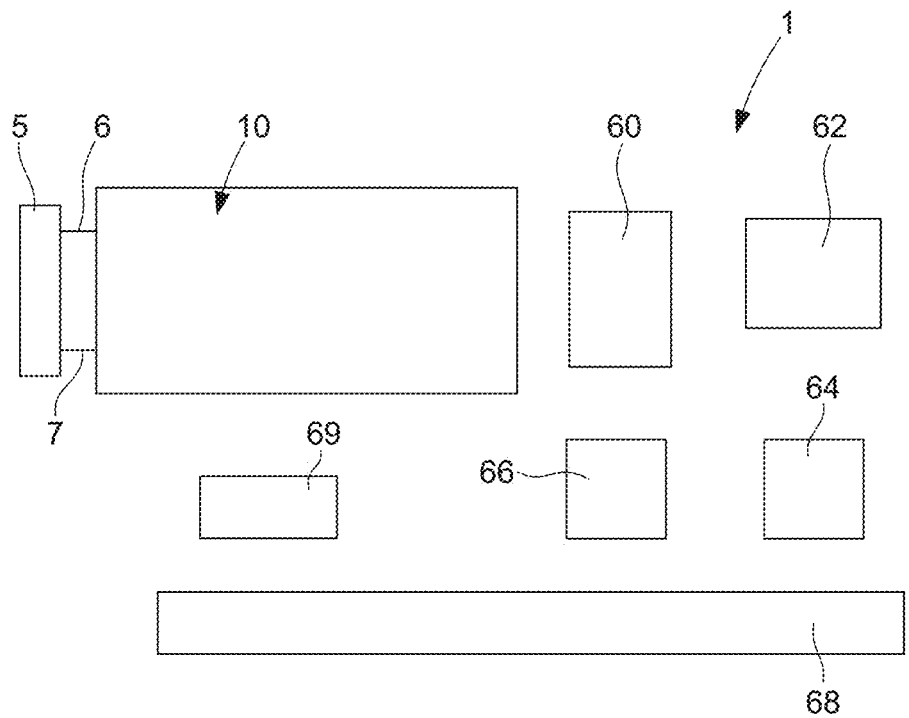
FIG. 3 shows a block diagram of an example of a semiconductor device comprising such a rectifier circuit.

In FIG. 3, there is illustrated a simplified and rather schematic block diagram of a passive UHF RFID circuit. The RFID circuit 1 comprises an antenna 5, which is connected to a rectifier circuit 10 by a first and a second antenna port 6, 7. The rectifier circuit 10 provides a transformation of an alternating AC signal as received from the antenna 5 into a DC signal required for operating the logic circuit 68 of the RFID circuit 1.

The RFID circuit 1 further comprises a reference voltage generator 60, a shunt limiter 62, and auto-match comparator 64, a ring oscillator 66 and an optional thermometer encoder 69.

The logic circuit 68 and the auto-match comparator 64 provide a limited operability at switching voltage threshold, which is below an operating voltage threshold required for the logic circuit 68 to provide the functional operation. Above the switching voltage threshold the auto-match comparator 64 and the logic circuit 68 may be operable to conduct an automatic matching function and/or to execute a trimming algorithm by way of which the resonance frequency of the rectifier circuit 10 can be automatically adjusted to the frequency of the RF field. In this way, the rectifier circuit can be automatically trimmed to the available RF frequency. This way, external or internal influences that have an impact on the intrinsic resonance frequency of the rectifier circuit can be effectively compensated. Such external or internal influences may be manufacturing tolerances of the electronic components of the rectifier circuit or may be based on varying external conditions, such as humidity or temperature.

However, and as long as the voltage level derived from the antenna 5 is below the switching voltage threshold the automatic matching function or execution of the trimming algorithm cannot be conducted since the harvested energy and hence the voltage level currently available is insufficient to operate any switches that are required to modify a capacitance of a trimming capacitor arrangement 30 of the rectifier circuit 10.

Figure 2:
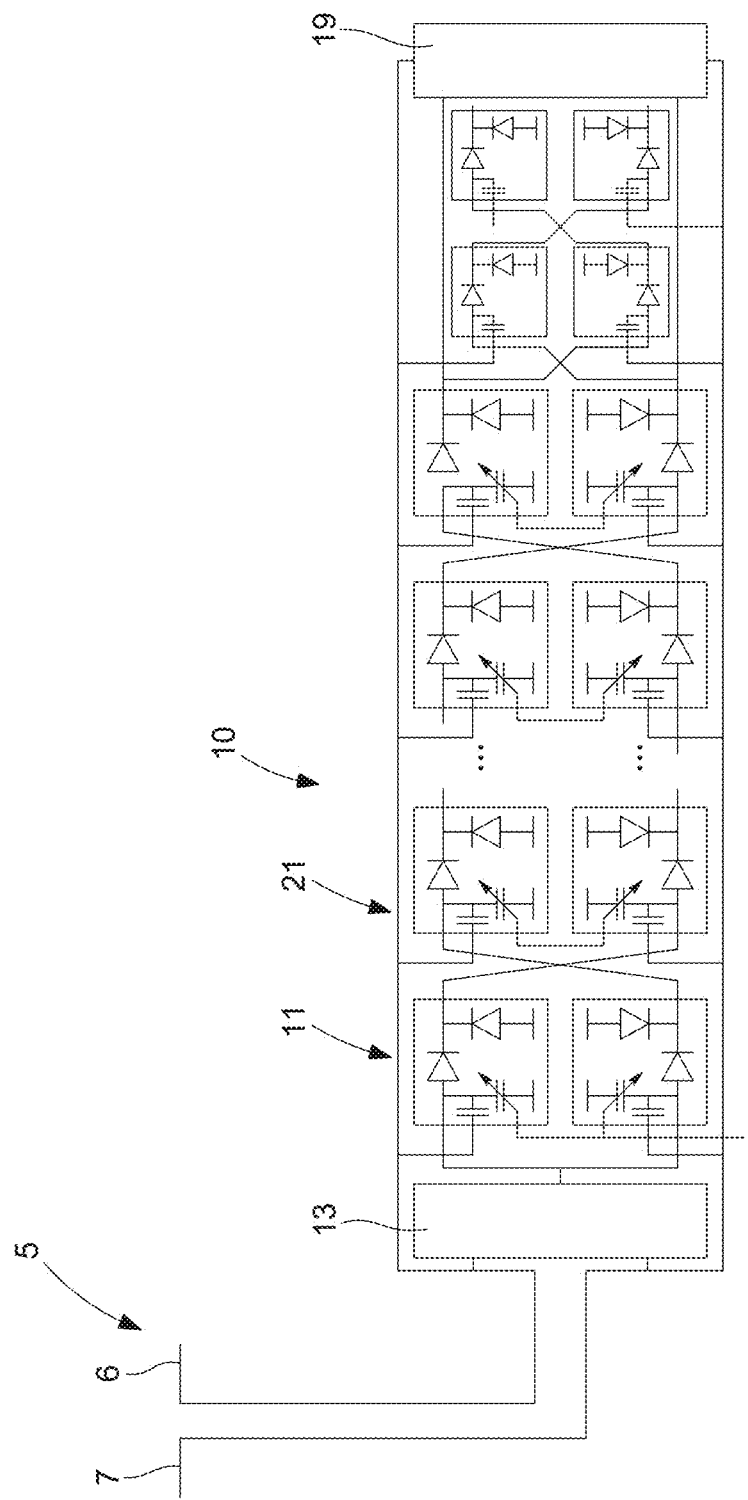
FIG. 2 shows a block diagram of the rectifier circuit comprising numerous rectifier stages.

As e.g. illustrated in the block diagram of FIG. 2, the rectifier circuit 10 may comprise numerous rectifier stages 11, 12. A first rectifier stage 11 may be connected to a ground generator 13. The ground generator may be further connected to the first and second antenna ports 6, 7. In addition, both rectifier stages 11, 21 as well as further rectifier stages are individually connected to the first and second antenna ports 6, 7. A last rectifier stage of a e.g. large number of rectifier stages 11, 21, e.g. of up to 12 rectifier stages 11, 21 is connected to a signal combiner 19, which in turn is connected or connectable to the reference voltage generator 60 as well as to the shunt limiter 62. An output of the shunt limiter 62 is typically connected to the logic circuit 68. The reference voltage generator 60 as well as the shunt limiter 62 may be also coupled or connected to the logic circuit 68 in order to enable a proper operation of the electronic units or components.

Figure 4:
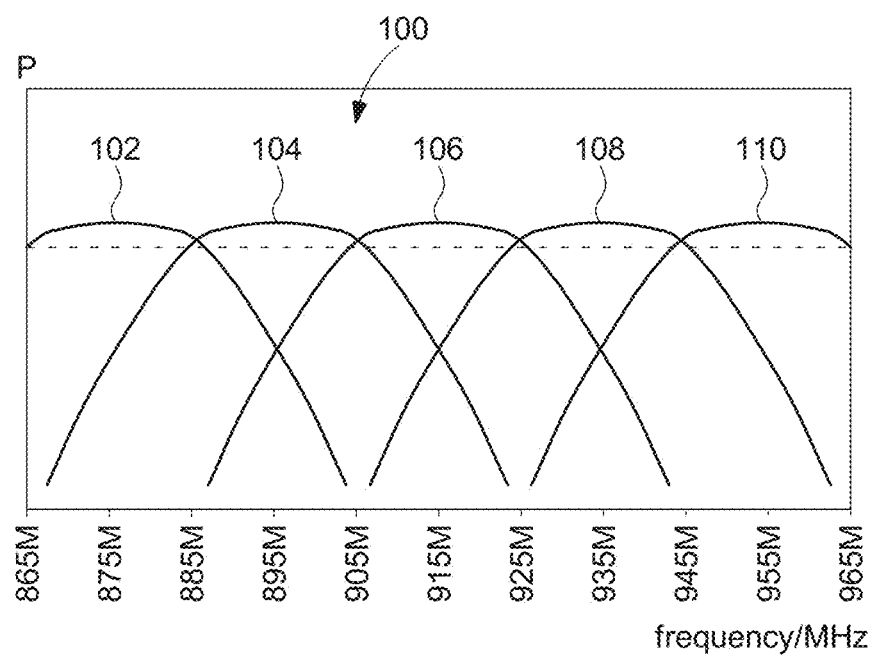
FIG. 4 shows a diagram illustrating an available power at load versus frequency for different configurations of the trimming capacitor arrangement.

In the diagram 100 of FIG. 4, there are illustrated five different graphs 102, 104, 106, 108 and 110 each of which illustrating a power level over frequency for different configurations of a trimming capacitor arrangement 30 of the rectifier circuit 10. The trimming capacitor arrangement 30 may be switched into a first configuration by way of which the power versus frequency graph 102 evolves. In a second configuration of the trimming capacitor arrangement 30 there can be obtained a dependency between power and frequency as e.g. shown by the graph 104.

The graph 106 is representative for another configuration of the trimming capacitor arrangement 30. The graph 108 represent another configuration of the trimming capacitor arrangement and the graph 110 finally shows a power dependency over frequency for a further trimming capacitor arrangement configuration. By selectively switching the trimming capacitor arrangement 30 from a first capacitance to a second capacitance, the behavior of the trimming capacitor arrangement 30 can be switched e.g. from graph 102 to any other graph 104, 106, 108, 110, and vice versa. In this way, the resonance frequency of the rectifier circuit 10 can be switched and/or adapted to varying conditions or frequencies of the surrounding RF field.

In order to select one of the trimming capacitor arrangement configurations as represented by the graphs 102, 104, 106, 108, 110, the input voltage derivable from the antenna 5 must be at or above the switching voltage threshold.

In situations, in which the input voltage is below that switching voltage threshold no switching of the trimming capacitor arrangement or reconfiguration of the trimming capacitor arrangement will be possible.

However, an optimal starting condition for an auto matching algorithm or auto matching network may be a mid-band configuration, e.g. as represented by graph 106. Since at the start-up there is no voltage and therefore no way to activate the configuration pursuant to graph 106 there now is provided an excess or extra capacitance to first and second stage input 14, 15 of the rectifier circuit 10 as will be described in connection with FIG. 1 below.

Figure 1:
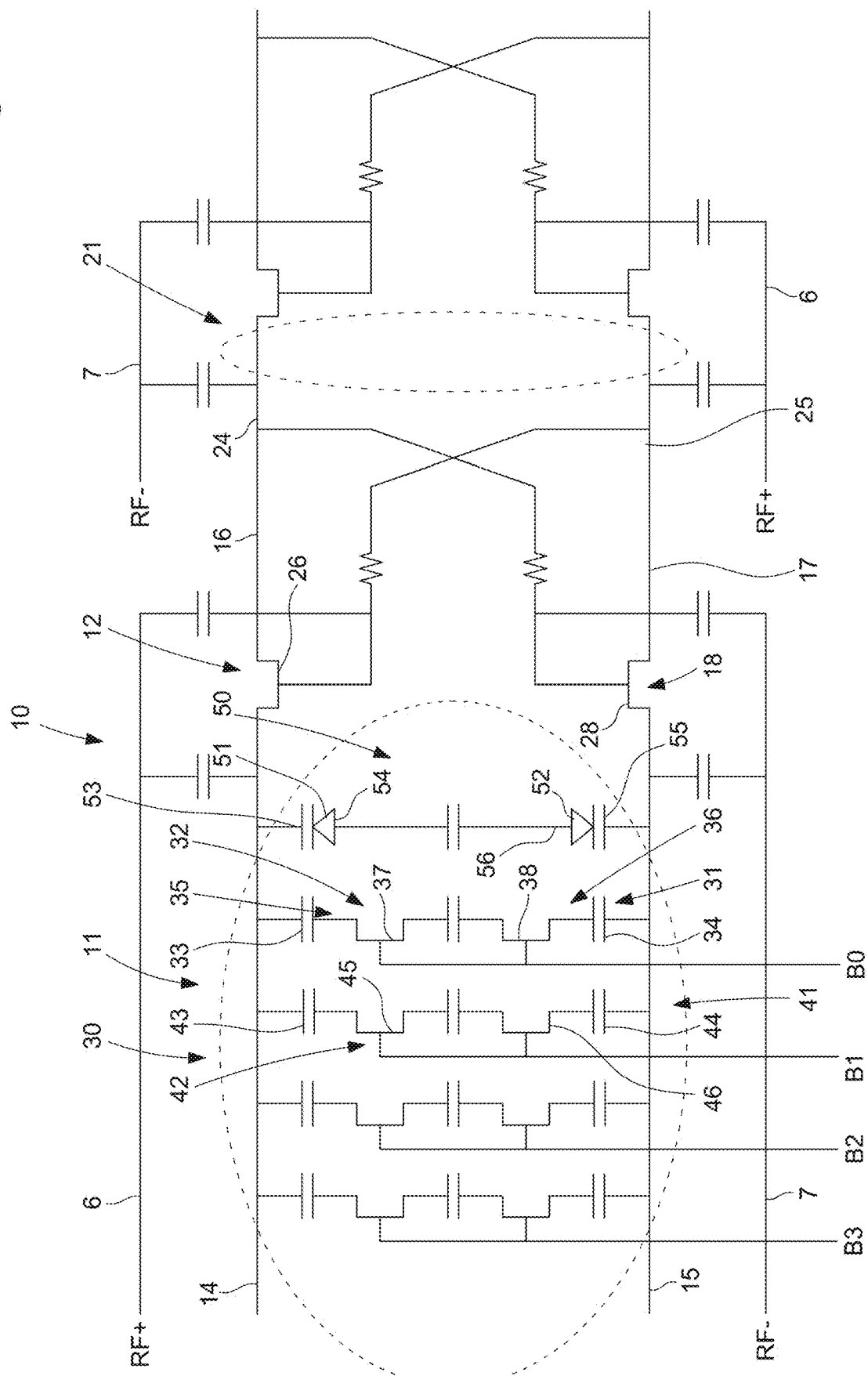
FIG. 1 shows a schematic block diagram of an example of a first stage of a rectifier circuit.

As it is apparent from FIG. 1, the rectifier circuit 10 comprises a first rectifier stage 11 and a second rectifier stage 21. Optionally, the rectifier circuit 10 comprises even more stages, e.g. up to 12 stages, which are all coupled or connected in series, e.g. in a cascaded manner.

The rectifier stage 11 comprises a positive stage input 14 and a negative stage input 15. The positive stage input 14 is connectable to one of the antenna ports 6, 7. The negative stage input 15 is connectable to the other one of the antenna ports 6, 7. The first rectifier stage 11 also comprises a first stage output 16, which is connected or which is connectable to a third stage input 24 of the second rectifier stage 21. Likewise, a second stage output 17 of the first rectifier stage 11 is connectable or is connected to a fourth stage input 25 of the second rectifier stage 21. The second rectifier stage 21 may comprise a similar or identical topology or structure compared to the first rectifier stage 11, which is indicated by the dashed oval structure in FIG. 1. The first stage output 16 is a positive stage output 16, whereas the second stage output 17 is a negative stage output 17.

The first rectifier stage 11 comprises a first rectifying unit 12 and a second rectifying unit 18. Both, the first and the second rectifying units 12, 18 are implemented as transistors. The first rectifier unit 12 may comprise a first transistor 26. The second rectifier unit 18 may comprise a second transistor 28.

The gate of the first transistor 26 is connected to the second stage output 17. The gate of the second transistor 28 is connected to the first stage output 16. One of the source and the drain of the first transistor 26 is connected to the positive stage input 14. The other one of the source and the drain of the first transistor 26 is connected to the first stage output 16. Likewise, one of the source and the drain of the second transistor 28 is connected to the negative stage input 15 whereas the other one of the source and the drain of the second transistor 28 is connected to the second stage output 17. The transistors 26, 28 may be connected in a bridged manner. They may be cross connected with the third and fourth stage inputs of the second rectifier stage 21.

The first rectifier stage 11 further comprises a trimming capacitor arrangement 30, which is electronically switchable to at least two different capacitances. For this, the trimming capacitor arrangement 30 comprises a number of individual trimming input B0, B1, B2, B3, which are controllable by the logic circuit 68, e.g. via the thermometer encoder 69.

However, trimming of the trimming capacitor arrangement 30 and hence modifying the capacitance of the trimming capacitor arrangement 30 requires a voltage at the stage inputs 14, 15, which is equal to or larger than the switching voltage threshold required for electronically switching the trimming capacitor arrangement 30. The trimming capacitor arrangement 30 comprises a first capacitor branch 31 and a second capacitor branch 41. The first capacitor branch 31 is provided with a switch arrangement 32. Likewise, the second capacitor branch 41 is provided with a second switch arrangement 42. The capacitance of each capacitor branch 31 is provided by first and second capacitors 33, 34. The first capacitor 33 is in series with a first switch 35. The second capacitor 34 is in series with a second switch 36.

The switches 35, 36 are implemented as switching transistors 37, 38. The first switching transistor 37 is in series with the first capacitor 33 and the second switching transistor 38 is in line or in series with the second capacitor 34. One of the first switching transistor 37 and the first capacitor 33 is connected to ground. The other one of the first switching transistor 37 and the first capacitor 33 is connected to the positive stage input 14. Likewise, one of the second transistor 38 and the second capacitor 34 is connected to ground. The other one of the second switching transistor 38 and the second capacitor 34 is connected to the negative stage input 15. The gates of the first and second switching transistors 37, 38 are interconnected. They may be operated by providing a logical one at the control input B0.

Likewise, the second capacitor branch 41 has a similar or identical structure compared to the first capacitor branch 31. Also here, there are provided first and second capacitors 34, 44 in series with first and second switches 45, 46. The switches 45, 46 are operable by providing a logical signal to the respective switching input B1.

In the illustrated embodiment there provided four capacitor branches altogether by way of which four different capacitances can be added as an extra capacitance or excess capacitance across the positive and negative stage inputs 14, 15. In this way, the impedance of the rectifier circuit and hence the resonance frequency of the rectifier stage 11 can be suitably adapted to the frequency of the RF field.

As e.g. indicated in FIG. 4 and when each of the switching ports B0, B1, B2, B3 is at a logical zero, the overall capacitance between the positive stage input 14 and the negative stage input 15 may be at a minimum, which is e.g. reflected by one of the graphs 102 or 110 of FIG. 4. In case that the RF field present at or before the start-up of the rectifier circuit 10 is in a region that is far away from the initial or default resonance frequency the mismatch between the external RF field and the resonance frequency of the rectifier circuit 10 may be too large or may be suboptimal to enable a rather prompt and fast start-up of the rectifier circuit 10 and hence of the entire RFID circuit 1.

Now and by providing of a voltage dependent variable capacitor arrangement 50 as further indicated in FIG. 1 there can be provided an initial additional capacitance across the positive stage input 14 and the negative stage input 15 by way of which the target point of the trimming capacitor arrangement 30 can be shifted towards the graph 106.

Hence, the resonance frequency of the rectifier circuit 10 can be shifted into a midrange region of the total trimming range of the trimming capacitor arrangement 30. With this additional capacitance as provided by the voltage dependent variable capacitor arrangement a lower mismatch and a better sensitivity of the rectifier circuit and hence of the entire RFID circuit 1 can be provided at zero voltage start-up conditions.

Since the voltage dependent variable capacitor arrangement 50 is dependent on the voltage applied to the positive and negative stage inputs 14, 15, the capacitance provided by the voltage dependent variable capacitor arrangement decreases with an increase of the voltage level across the positive stage input 14 and the negative stage input 15.

Accordingly, and as the input voltage reaches the switching voltage level the influence or impact of the voltage dependent variable capacitor arrangement 50 to the total input capacitance decreases.

Ideally and in effect, the total input capacitance of the trimming capacitor arrangement 30 and the voltage dependent variable capacitor arrangement 50 at a start-up condition, e.g. where a zero voltage level is present at the positive stage input 14 and the negative stage input 15, can be shifted close to the input impedance of the rectifier stage 11 with the trimming capacitor arrangement set to a middle of the trimming range. This can provide the appearance that the rectifier circuit and hence the entire RFID circuit 1 is starting the auto-match algorithm closer to the mid-band region, which is statistically the best matching to transfer RF energy from the external RF field into the rectifier circuit 10. As a voltage level of e.g. about 750 mV is reached the automatic matching function can be operated. If the voltage is then continuing to change rapidly versus voltage from the switching voltage level towards a functional operation level (e.g. at 1.5 V), at which the logic circuit 68 is fully operable, the influence of the voltage dependent variable capacitor arrangement further decreases and becomes somewhat irrelevant for not disturbing the tuning or trimming algorithm, which may otherwise choose incorrect trim point for an optimally matched setting.

In the present, the illustrated embodiment the voltage dependent variable capacitor arrangement 50 comprises a first varactor 51 and a second varactor 52. The first varactor 51 is connected to the positive stage input 14. The second varactor 52 is connected to the negative stage input 15. The first varactor 51 comprises a cathode 53 and an anode 54. The second varactor 52 comprises a cathode 55 and an anode 56. As indicated, the cathodes 53, 55 of the varactors 51, 52 are connected to the positive and to the negative stage inputs 14, 15, respectively. The anodes 54, 56 of the first and the second varactors 51, 52 are connected to ground. In this way, there can be provided a voltage dependent capacitance to each of the positive and to the negative providing an excess or a supplemental capacitance especially at a start-up of the rectifier circuit 10, where no voltage is initially present at all.

Figure 8:
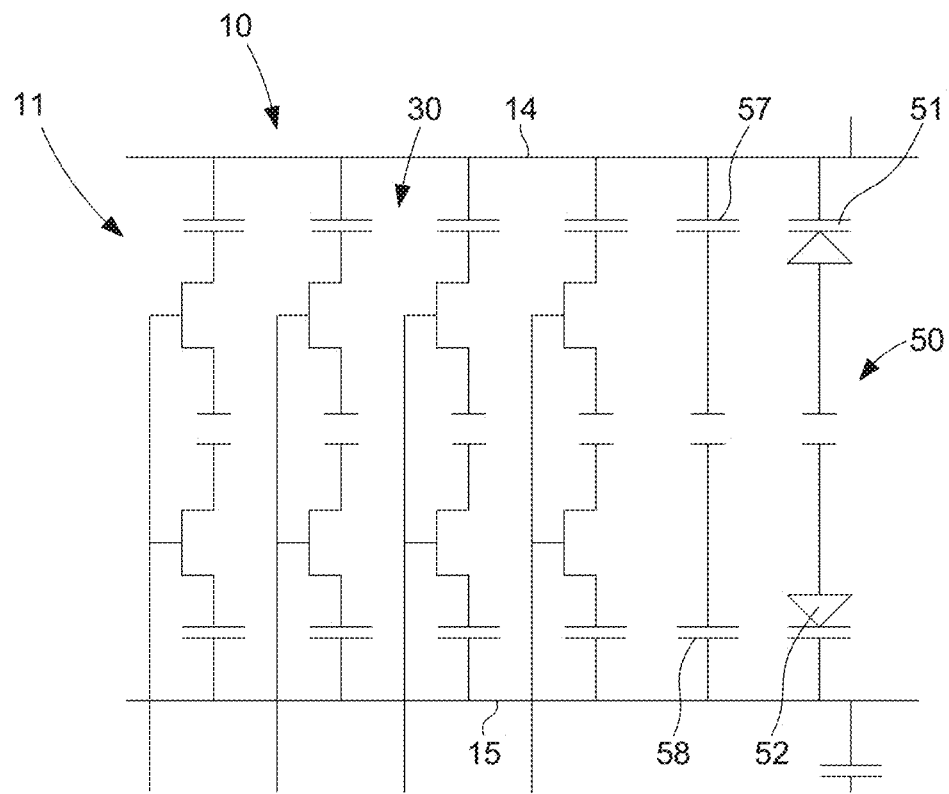
FIG. 8 is a block diagram showing a further embodiment of a rectifier stage.

In order to dampen or to reduce the influence of the voltage dependent variable capacitor arrangement 50, there can be implemented another embodiment as shown in FIG. 8. There is provided a supplemental capacitor in parallel with the varactors 51, 52. Hence, there is provided a first capacitor 57 parallel to the first varactor 51 and there is provided a second capacitor 58 parallel the second varactor 52. It may be sufficient to have the varactors 51, 52 in parallel with the capacitors 57, 58 only for one specific stage or to some of the numerous stages in the rectifier and e.g. only to selected rectifier stages since there will be a different DC voltages when the trimming capacitor arrangement 30 is properly adjusted and becomes operational.

The varactor 51, 52 in parallel with traditional capacitors 57, 58 allows to attenuate the capacitance to voltage dependency of the varactors 51, 52 as necessary to provide the above described functionality of reducing the impact or influence of the varactors in the regular operation mode of the automatic matching function or trimming algorithm.

Typically, the resonance frequency of the rectifier circuit changes inversely as the square root of the change of the capacitance of the trimming capacitor arrangement, the voltage dependent variable capacitor arrangement and the optional capacitors 57, 58.

The resonance frequency shift may be then controlled by a ratio of the fixed capacitors 57, 58 to the varactor 51, 52. A trade-off between the amount of frequency shift versus DC voltage can then be optimized between the frequency delta at start-up (zero) and the frequency delta between the switching voltage threshold and the operating voltage threshold (e.g. 750 mV and 1.5V). The bandwidth of each trimmable capacitor branch 31, 41 may be in a range of 25 MHz so the frequency movement between the switching voltage mode and the operating voltage moder should not be more than 25% of the bandwidth of such a trimmable capacitor branch. Therefore, and for some examples the frequency movement may be limited to 6.25 MHz.

Figure 5:
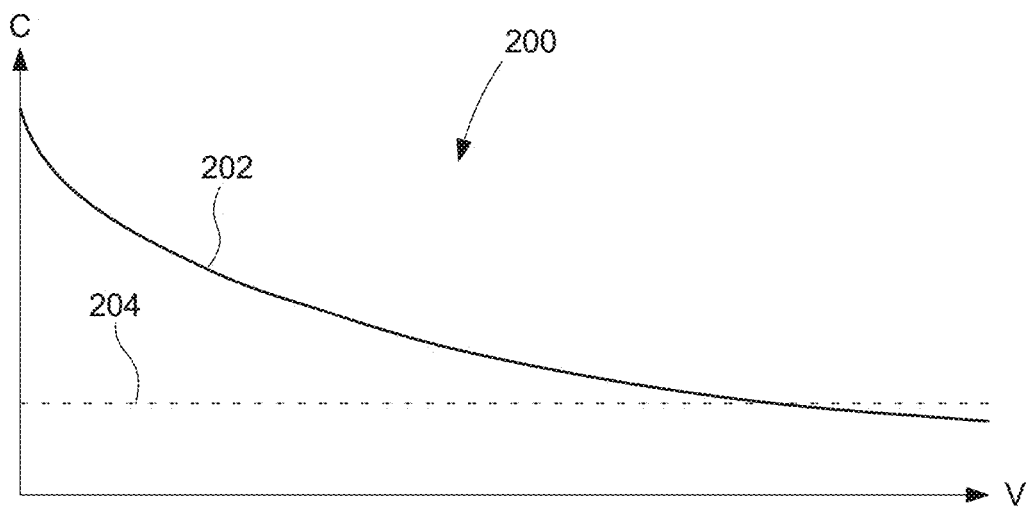
FIG. 5 shows a diagram of a capacitance versus voltage for a conventional capacitor in comparison to a voltage dependent variable capacitor.

In FIG. 5, there is shown a diagram 200 illustrating the capacitance versus voltage for a standard capacitor in the graph 204 and for a varactor in graph 202. By placing both, the varactors 51, 52 and the capacitors 57, 58 in parallel a composite curve can be generated to provide the desired capacitance versus voltage curve as will be explained further below in FIG. 6.

Figure 6:
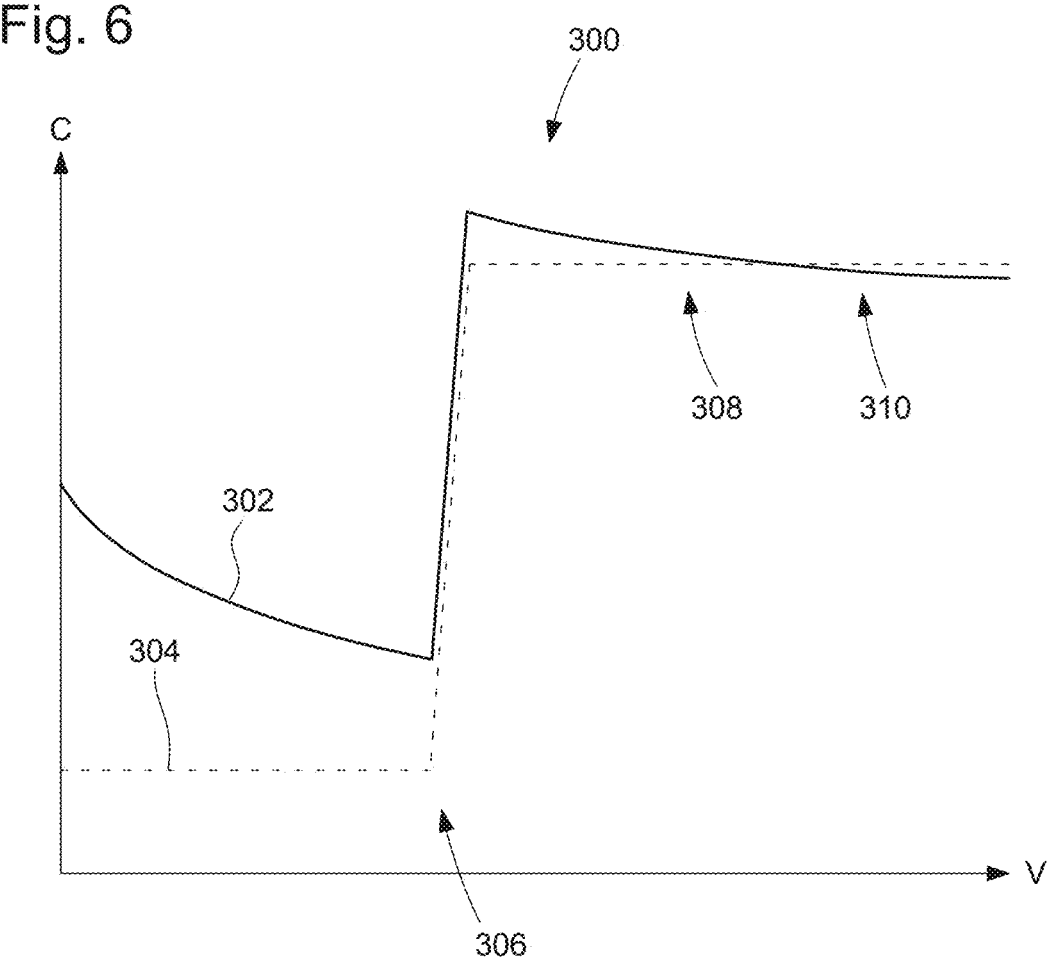
FIG. 6 is a further diagram illustrating the total capacitance of the first stage of the rectifier circuit versus voltage provided from the antenna.

The diagram 300 of FIG. 6 shows a graph 304 reflecting the total capacitance of the rectifier stage 11 depending on the voltage across the positive and negative stage inputs 14, 15 without the voltage dependent variable capacitor arrangement 50 and the graph 302 shows the respective capacitance versus voltage behavior with the voltage dependent variable capacitor arrangement 50.

With the configuration reflected by the graph 304, the capacitance is rather insensitive to the voltage across positive and negative stage inputs 14, 15. The capacitance starts at some local capacitance level at zero volt and then at some point, e.g. at or near the switching voltage threshold 306 the capacitance just jumps to a higher level when there is enough voltage present to enable the numerous switches of the capacitor branches 31, 41 to switch.

Then and at an even higher voltage level 308 the auto-match circuit may start to operate and tune the tag and the rectifier circuit 10 to a proper trimming point. This may lead to a further increase of the voltage due to reaching the best matching conditions. After the auto-match routine has completed the logic circuit 68 may enter into a functional mode at a voltage level 310.

For the presently proposed implementation, wherein the voltage dependent variable capacitor arrangement 50 is present at the positive and negative stage inputs 14, 15 it is shown that at a zero voltage level the capacitance is closer to the midterm capacitance and there is a reduced mismatch between the RF energy as provided by the external RF field and the resonance frequency of the rectifier circuit. Then the same jump occurs when there is enough voltage present at the voltage level 306 to enable a first tuning or switching of the trimming capacitor arrangement 30. When the auto-match start voltage level 308 has been reached the capacitance is nearly the same as in the case in the absence of a voltage dependent variable capacitor arrangement as indicated in the graph 304. Additionally and after a further increase in voltage in at or near the voltage level 310, which is the functional operation voltage for the logic circuit 68, the capacitance is nearly the same as in the case without the voltage dependent variable capacitor arrangement. The slope of the graph 302 between the voltage levels 308 and 310 represents a limiting factor as to how large the ratio of the varactors 51, 52 to the capacitors 57, 58 can be.

Generally, and by way of the voltage dependent variable capacitor arrangement 50 the RFID circuit 1 can be rather close to a mid-band trimming, which is necessary for proper operation. Moreover, the start-up sensitivity can be improved since the resonance frequency of the rectifier circuit at a start-up condition (zero volt) is closer to a midpoint of the tunable range of the trimming capacitor arrangement. Accordingly, also the amount of time required for starting the auto-match procedure can be decreased since there is more power available at the rectifier directly at the start of harvesting RF energy from the external field.

Figure 7:
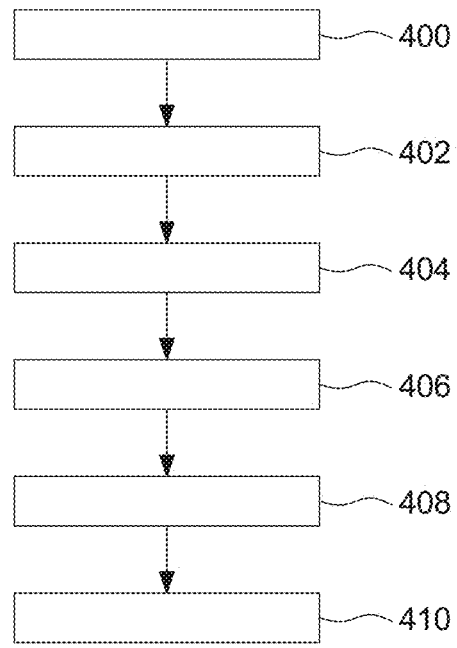
FIG. 7 is a flowchart illustrating the method of operating a semiconductor device.

In the flowchart of FIG. 7, the method of operating a semiconductor device as described herein is briefly described. In a step 400 there is harvested electrical energy from an external RF field by the RF antenna 5. In a subsequent step 402 there is provided an extra capacitance to the first stage input 14 and the second stage input 15 by the voltage dependent variable capacitor arrangement 50. This extra capacitance provides an increased sensitivity of the rectifier circuit because it shifts resonance frequency is closer to the midpoint of a trimming range as provided by a trimming capacitor arrangement 30. Then and in a subsequent step 404 energy is harvested and the voltage across the first and the second stage input 14, 15 rises up to a switching voltage threshold required to electronically switch the trimming capacitor arrangement 30. This switching operation is then conducted in step 406 provided that the voltage across the first and the second stage input 14, 15 is sufficient to operate the switching algorithm. Thereafter in step 408 the trimming capacitor arrangement is adjusted to proper trimming conditions and in step 410 the passive RFID circuit 1 switches into a functional operation mode.

NOMENCLATURE

1 RFID circuit
5 antenna
6 antenna port
7 antenna port
10 rectifier circuit
11 rectifier stage
12 rectifier unit
13 ground generator
14 stage input
15 stage input
16 stage output
17 stage output
18 rectifier unit
19 signal combiner
21 rectifier stage
24 stage input
25 stage input
26 transistor
28 transistor
30 trimming capacitor arrangement
31 capacitor branch
32 switch arrangement
33 capacitor
34 capacitor
35 switch
36 switch
37 transistor
38 transistor
41 capacitor branch
42 switch arrangement
43 capacitor
44 capacitor
45 switch
46 switch
50 variable capacitor arrangement
51 varactor
52 varactor
53 cathode
54 anode
55 cathode
56 anode
57 capacitor
58 capacitor
60 reference voltage generator
62 shunt limiter
64 auto-match comparator
66 ring oscillator
68 logic circuit
69 thermometer encoder

The invention claimed is:

1. A rectifier circuit for a passive RFID circuit, the rectifier circuit comprising:
at least a first rectifier stage comprising a positive stage input connectable to a first antenna port and comprising a negative stage input connectable to a second antenna port,
a first rectifying unit connected to the positive stage input and connected to a positive stage output,
a second rectifying unit connected to the negative stage input and connected to a negative stage output,
a trimming capacitor arrangement connected to the positive stage input and connected to the negative stage input, wherein the trimming capacitor arrangement is electronically switchable to at least a first capacitance and to a second capacitance, and
a voltage dependent variable capacitor arrangement connected to the positive stage input and connected to the negative stage input, wherein the first rectifying unit comprises a first transistor, wherein one of a source and a drain of the first transistor is connected to the positive stage input, wherein the other one of the source and the drain of the first transistor is connected to the positive stage output and wherein a gate of the first transistor is connected to the negative stage output, and wherein the second rectifying unit comprises a second transistor, wherein one of a source and a drain of the second transistor is connected to the negative stage input, wherein the other one of the source and the drain of the second transistor is connected to the negative stage output and wherein a gate of the second transistor is connected to the positive stage output.

2. The rectifier circuit according to claim 1, wherein the voltage dependent variable capacitor arrangement comprises a first varactor connected to the positive stage input.

3. The rectifier circuit according to claim 2, wherein the first varactor comprises a cathode and an anode, wherein the cathode of the first varactor is connected to the positive stage input and wherein the anode of the first varactor is connected to ground.

4. The rectifier circuit according to claim 1, wherein the voltage dependent variable capacitor arrangement comprises a second varactor connected to the negative stage input.

5. The rectifier circuit according to claim 4, wherein the second varactor comprises a cathode and an anode, wherein the cathode of the second varactor is connected to the negative stage input and wherein the anode of the second varactor is connected to ground.

6. The rectifier circuit according to claim 4, further comprising a first capacitor parallel to the first varactor and a second capacitor parallel to the second varactor.

7. The rectifier circuit according to claim 1, further comprising a second rectifier stage comprising a third stage input connected to the positive stage output of the first rectifier stage and comprising a fourth stage input connected to the negative stage output of the first rectifier stage.

8. The rectifier circuit according to claim 1, wherein the trimming capacitor arrangement comprises a first switchable capacitor branch connected to the positive stage input and connected to the negative stage input.

9. The rectifier circuit according to claim 8, wherein the trimming capacitor arrangement comprises a second switchable capacitor branch parallel to the first switchable capacitor branch.

10. The rectifier circuit according to claim 8, wherein the first switchable capacitor branch comprises a first capacitor in series with a first switch, wherein one of the first capacitor and the first switch is connected to ground and wherein the other one of the first capacitor and the first switch is connected to the positive stage input.

11. The rectifier circuit according to claim 10, wherein the first switchable capacitor branch comprises a second capacitor in series with a second switch, wherein one of the second capacitor and the second switch is connected to ground and wherein the other one of the second capacitor and the second switch is connected to the negative stage input.

12. A semiconductor device comprising:
a RF antenna,
a rectifier circuit according to claim 1 connected to the RF antenna,
a logic circuit operable to electronically switch the trimming capacitor arrangement of the rectifier circuit to at least one of the first capacitance and the second capacitance.

13. A method of operating a semiconductor device according to claim 12, the method comprising the steps of:
harvesting electrical energy from an external RF field by the RF antenna,
providing an extra capacitance to the positive stage input and to the negative stage input by the voltage dependent variable capacitor arrangement as long as an input voltage derived from the external RF field is below a switching voltage threshold required to electronically switch the trimming capacitor arrangement.

* * * * *